(12) United States Patent
Pfaeffle et al.

(10) Patent No.: US 7,500,465 B2
(45) Date of Patent: Mar. 10, 2009

(54) METHOD FOR OPERATING AN INTERNAL COMBUSTION ENGINE

(75) Inventors: Andreas Pfaeffle, Wuestenrot (DE); Marco Gangi, Esslingen (DE); Gerit Von Schwertfuehrer, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 11/664,373

(22) PCT Filed: Aug. 18, 2005

(86) PCT No.: PCT/EP2005/054084

§ 371 (c)(1),
(2), (4) Date: Mar. 30, 2007

(87) PCT Pub. No.: WO2006/037690

PCT Pub. Date: Apr. 13, 2006

(65) Prior Publication Data

US 2008/0103673 A1    May 1, 2008

(30) Foreign Application Priority Data

Oct. 1, 2004    (DE) .................. 10 2004 048 008

(51) Int. Cl.
*F02D 41/30* (2006.01)

(52) U.S. Cl. .................. 123/299; 123/436; 123/480; 701/103

(58) Field of Classification Search ........... 123/299, 123/478, 480, 436; 701/103–105, 110
See application file for complete search history.

(56) References Cited

U.S. PATENT DOCUMENTS

| 6,223,721 | B1 | 5/2001 | Bauer et al. | |
|---|---|---|---|---|
| 7,194,997 | B2 * | 3/2007 | Pitzal et al. | 123/299 |
| 2004/0050360 | A1 * | 3/2004 | Happenhofer et al. | 123/299 |

FOREIGN PATENT DOCUMENTS

| DE | 199 28 825 | 12/2000 |
|---|---|---|
| DE | 102 18 552 | 10/2002 |
| EP | 1 420 157 | 5/2004 |
| JP | 2001/003800 | 1/2001 |

OTHER PUBLICATIONS

Patent Abstracts of Japan, vol. 2000, No. 16, May 8, 2001.

* cited by examiner

*Primary Examiner*—Hai H Huynh
(74) *Attorney, Agent, or Firm*—Kenyon & Kenyon LLP

(57) ABSTRACT

A method for operating an internal combustion engine, in which fuel is injected into a combustion chamber of a cylinder of the internal combustion engine in at least two partial injections, and in which an actual torque supplied by the internal combustion engine is ascertained from operating variables of the internal combustion engine, this actual torque being compared to an admissible torque, and an error response being initiated if the actual torque is at a predefined ratio to the admissible torque. In the ascertainment of the actual torque, taking into consideration a torque efficiency of the respective partial injection is provided, whereby a more accurate monitoring of the actual torque is made possible.

29 Claims, 3 Drawing Sheets

METHOD FOR OPERATING AN INTERNAL COMBUSTION ENGINE

BACKGROUND INFORMATION

The present invention relates to a method for operating an internal combustion engine in which fuel is injected into a combustion chamber of a cylinder of the internal combustion engine in at least two partial injections, and in which an actual torque supplied by the internal combustion engine is ascertained from operating variables of the internal combustion engine, this actual torque being compared to an admissible torque, and an error response being initiated if the actual torque is at a prespecified ratio to the admissible torque.

The present invention also relates to an internal combustion engine as well as a control unit for an internal combustion engine. In addition, the present invention also relates to a computer program for a control unit of an internal combustion engine.

Usual operating methods of the type mentioned above may have the disadvantage that the ascertainment of the actual torque of the internal combustion engine may be possible only at low accuracy, especially for operating types of the internal combustion engine in which partial injections are made.

SUMMARY

It is an object of the present invention to further develop this type of operating method as well as an internal combustion engine and a control unit for an internal combustion engine, and beyond that, also a computer program for such a control unit in such a way that an accurate ascertainment of the actual torque is made possible.

This object may be attained in response to the above-named operating method in that, during the ascertainment of the actual torque, a torque efficiency of each partial injection is taken into consideration.

By doing this, the fact is taken into consideration that not every partial injection makes the same contribution to an actual torque supplied by the internal combustion engine. Rather, the respective torque contribution of a partial injection is a function of a plurality of parameters.

According to one advantageous specific embodiment of the method according to the present invention, the torque efficiency is ascertained as a function of a rotary speed of the internal combustion engine.

A further very advantageous specific embodiment of the method according to the present invention provides that the torque efficiency be ascertained as a function of a crankshaft and/or an A of the internal combustion engine. By taking into consideration the crank angle or the A, the influence of a relationship in time between the corresponding partial injection and the operating cycle of the internal combustion engine on the torque efficiency is modeled. In this context, the angle of beginning activation indicates at which crank angle, that is, at which time with respect to the operating cycle of the internal combustion engine an activation of an actuating mechanism begins, which results in the partial injection.

In addition, in another very advantageous specific embodiment of the method according to the present invention, it is provided that one should ascertain the torque efficiency as a function of the partial injection quantity corresponding to the respective partial injection.

According to another specific embodiment of the present invention, it is especially advantageous also to ascertain the torque efficiency as a function of a time difference between different partial injections, whereby, among other things, preheating of the combustion chamber by preceding combustions, and an improved ignitability are able to be taken into consideration.

Quite particularly advantageously, the torque efficiency is ascertained, in response to a further variant of the present invention, as a function of a time difference between a main injection and another, partial injection.

In this instance, by a main injection one should understand that one of several partial injections which, generally, supplies the greatest torque contribution to the actual torque supplied by the internal combustion engine, at equal injection quantity. Besides distinguishing the main injection, in the following description a difference is also made between so-called pre-injections and so-called post-injections, pre-injections designating those partial injections which take place before the main injection in time, and post-injections designating those partial injections which take place after the main injection in time.

Another very advantageous specific embodiment of the method according to the present invention provides that the torque efficiency be ascertained as a function of a variation with time of a combustion. If additional data on the curve of the combustion are available or ascertainable, these may be advantageously drawn upon, according to the present invention, for the exact ascertainment of the torque efficiency. As far as such data are concerned, a pressure curve or a temperature curve over time, in the combustion chamber, may be involved, for example.

According to an additional specific embodiment of the present invention, it is also possible to ascertain the torque efficiency as a function of an intake air temperature and/or of an air pressure and/or of signals of a knock sensor and/or of additional sensor signals and/or operating variables of the internal combustion engine.

In yet another advantageous specific embodiment of the present invention, the torque efficiency, or even a variable derived from it, is linked additively and/or multiplicatively and/or via a characteristics map to a partial injection quantity corresponding to the respective partial injection.

Furthermore, in another specific embodiment of the present invention it is provided that ascertained values of the torque efficiency be stored and/or reused, it being also possible to set up a characteristics map, including various values of the torque efficiency, using the ascertained values of the torque efficiency, or to supplement it and/or to adjust it.

According to a further very advantageous specific embodiment of the method according to the present invention, for the purpose of ascertaining the actual torque, a virtual overall fuel quantity is ascertained, preferably as a function of the torque efficiency. This virtual overall fuel quantity represents that fuel quantity which, instead of the several partial injections, would have to be injected at one single main injection into the combustion chamber of the internal combustion engine, in order to effect the same torque as the partial injections on which the calculation of the virtual overall fuel quantity is based.

Consequently, the virtual overall fuel quantity permits a computationally simple summary of manifold factors that are able to influence the actual torque of the internal combustion engine, and therewith also an efficient processing, for instance, in a control unit.

According to one very advantageous specific embodiment of the method according to the present invention, an operating point of the internal combustion engine is checked for plausibility, the operating point being defined preferably at least by a virtual overall fuel quantity and/or a rotary speed of the internal combustion engine.

Such a check for plausibility according to the present invention is of advantage if no characteristics maps or the like are present, in the control unit provided for ascertaining the actual torque, that would directly include the above-described connection between, for instance, a rotary speed of the internal combustion engine, an angle of beginning activation, etc., and the torque efficiency. For instance, rather, various characteristics maps are present which, among other things, are also dependent on an operating point of the internal combustion engine. In that case, the torque efficiency cannot be directly calculated, as in the exemplary embodiments described above.

To ascertain the actual torque, it is possible, to be sure, to fall back on values of operating variables that are used in controlling the internal combustion engine, but these values must not be taken over from the controller without validation, particularly for the ascertainment of the actual torque according to the present invention, which is able to be used for monitoring the internal combustion engine.

Because of this, for instance, the use of present characteristics maps is possible based on ascertained operating variables of the internal combustion engine, and with the aid of the values from the controller, while simultaneously using the plausibility check, according to the present invention, of an operating point of the internal combustion engine. As soon as a corresponding operating point has been checked for plausibility, using the plausibility check according to the present invention, the torque efficiency, for instance, is able to be calculated using the present characteristics maps, or even a fuel correction quantity that is equivalent to the torque efficiency.

Another very advantageous specific embodiment of the method according to the present invention is characterized in that the plausibility check of the operating point is made as a function of an operating mode of the internal combustion engine.

Such an operating mode is, for instance, the so-called regeneration operation in which, among other things, as high as possible an exhaust gas temperature is set by at least one post-injection, in order to regenerate a particulate filter located in the exhaust branch of the internal combustion engine, by burning off the soot particles that have collected in it.

Another very advantageous specific embodiment of the method according to the present invention provides that criteria for the plausibility check be selected in dependence upon the operating mode.

In one further variant of the present invention, it is provided that in an operating mode of the internal combustion engine not having post-injections, an injection duration of a post-injection, ascertained from operating variables of the internal combustion engine, is monitored for exceeding a specified threshold value. Thereby it can be ensured that an undesired post-injection, based on an error, for example, in the controller of the internal combustion engine, is detected.

Another very advantageous specific embodiment of the operating method according to the present invention is characterized in that the internal combustion engine is operated in an operating mode having at least one post-injection, especially in a regeneration operating mode for the regeneration of a particulate filter in an exhaust gas branch of the internal combustion engine.

In line with an additional very advantageous specific embodiment according to the present invention, the internal combustion engine is operated in an operating mode having at least one pre-injection.

Another very advantageous variant of the operating method according to the present invention provides that the internal combustion engine is operated in an operating mode in which a torque supplied by the internal combustion engine is able to be adjusted by a change in an air quantity. The change in the air quantity may be effected, for instance, by a throttle valve in an intake tract of the internal combustion engine.

A further variant of the method according to the present invention is characterized in that injection parameters ascertained from operating variables of the internal combustion engine, especially an injection type point in time and an injection duration are monitored for agreement with setpoint injection parameters ascertained using a controller of the internal combustion engine.

Yet a further variant of the present invention provides that an influence of a lambda regulation is monitored for the exceeding of a predefinable boundary value. The lambda regulation is provided in the internal combustion engine for the purpose of setting a certain air/fuel ratio, in order to manage an operation of the internal combustion engine that is especially free of polluting agents and is reliable. Within the scope of the control of the internal combustion engine, the lambda regulation usually has the effect that a setpoint value, for a fuel quantity that is to be injected, is changed by an appropriate value that is a function of the lambda regulation. If the value for the fuel quantity, that is to be corrected based on the lambda regulation, exceeds a predefinable boundary value, an error response is initiated, for example.

According to one further very advantageous specific embodiment of the method according to the present invention, preferably after the expiration of a filter time, an error response is initiated if the plausibility check turns out wrong.

Another variant of the method according to the present invention provides, preferably during the filter time, that a maximum possible torque efficiency is assumed. Because, during the filter time, one cannot conclusively assume an error; on the other hand, it is possible that there is indeed an error, so that in this case torque efficiencies ascertained in the control unit could possibly be wrong.

Another very advantageous specific embodiment of the method according to the present invention is characterized in that the maximum possible torque efficiency is obtained from a controller of the internal combustion engine, so that, during the ascertainment of this maximum possible torque efficiency, the variables already present in the controller are able to be used.

The implementation of the method according to the present invention in the form of a computer program, the computer program having program codes suitable for carrying out the method according to the present invention, when it is executed on a computer. Furthermore, the program code may be stored on a computer-readable data carrier, such as in a so-called flash memory. Thus, in these cases, the present invention is implemented by the computer program, so that this computer program represents the present invention in the same manner as does the method, for the execution of which the computer program is suitable.

BRIEF DESCRIPTION OF THE DRAWINGS

Additional features, applications and advantages of the present invention are derived from the following description of exemplary embodiments of the present invention, which are illustrated in the figures.

DETAILED DESCRIPTION OF EXAMPLE EMBODIMENTS

Figure 1:
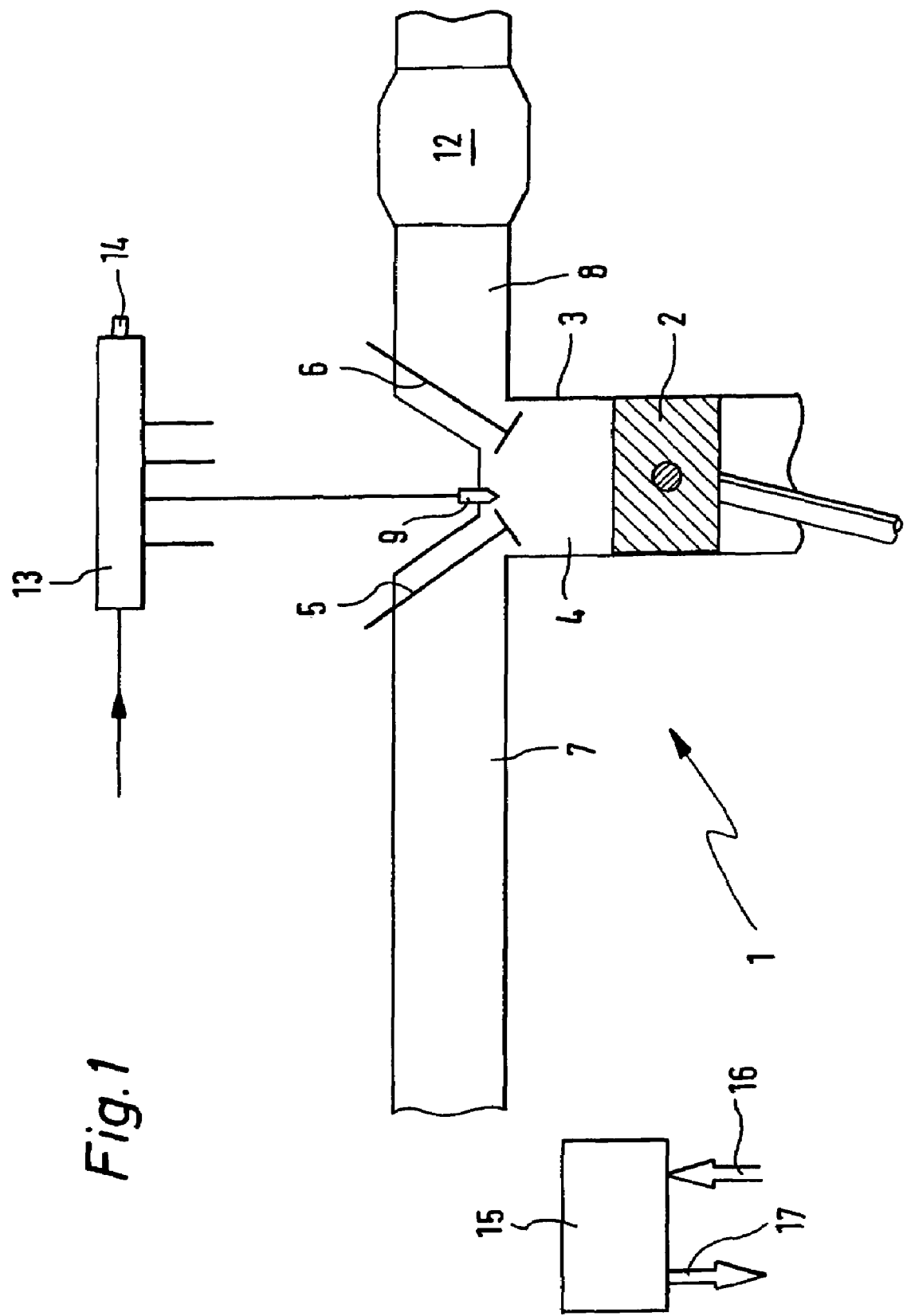
FIG. 1 shows a schematic block diagram of an internal combustion engine according to an example embodiment of the present invention.

FIG. 1 shows an internal combustion engine 1 of a motor vehicle in which a piston 2 is able to be moved back and forth in a cylinder 3. Cylinder 3 is equipped with a combustion chamber 4, which, among other things, is delimited by piston 2, an intake valve 5 and an exhaust valve 6. An intake manifold 7 is connected to intake valve 5, and an exhaust pipe 8 is connected to exhaust valve 6.

In the region of intake valve 5 and exhaust valve 6, fuel injector 9 extends into combustion chamber 4, via which fuel is able to be injected into combustion chamber 4. A catalytic converter 12 is accommodated in exhaust pipe 8 to purify the exhaust gases created by the combustion of fuel.

Fuel injector 9 is connected to a fuel accumulator 13 via a pressure line. The fuel injectors of the other cylinders of internal combustion engine 1 are likewise connected to fuel accumulator 13 in a corresponding manner. Fuel accumulator 13 is supplied with fuel via a supply line. A preferably mechanical fuel pump, which is suitable for generating the desired pressure in fuel accumulator 13, is provided for this purpose.

Furthermore, a pressure sensor 14 by which the pressure in fuel accumulator 13 is able to be measured, is also arranged at fuel accumulator 13. This pressure is the pressure exerted on the fuel and which is therefore used to inject the fuel into combustion chamber 4 of internal combustion engine 1 via fuel injector 9.

During operation of internal combustion engine 1, fuel is conveyed into fuel accumulator 13. This fuel is injected into associated combustion chambers 4 via fuel injectors 9 of the individual cylinders 3. Pistons 2 will be put into back and forth motion by the combustion of the air/fuel mixture prevailing in combustion chamber 4. These movements are transmitted to a crankshaft (not shown) and exert a torque on it.

A control unit 15 receives input signals 16, which represent operating variables of internal combustion engine 1 measured by sensors. For instance, control unit 15 is connected to pressure sensor 14, an air-mass sensor, an engine-speed sensor and the like. Moreover, control unit 15 is connected to an accelerator sensor, which generates a signal indicating the setting of a driver-operable accelerator and thereby indicates the torque that is called for. Control unit 15 generates output signals 17 by which the performance of internal combustion engine 1 may be influenced via actuators or setters. For example, control unit 15 is connected to fuel injector 9 and the like and generates the signals required for their triggering.

Among others, control unit 15 is provided to control and/or regulate the operating variables of internal combustion engine 1. For example, the fuel mass injected into combustion chamber 4 by fuel injector 9 is controlled and/or regulated by control unit 15 in particular with respect to low fuel consumption and/or low pollutant generation. To this end, control unit 15 is equipped with a microprocessor, which has a computer program stored in a storage medium, in particular a flash memory that is suitable to execute the control and/or regulation mentioned.

Also disposed in control unit 15 is a functional monitoring of internal combustion engine 1 which is based on a determination of the torque supplied by internal combustion engine 1, which is designated as the actual torque from here on.

The actual torque is ascertained in calculating fashion in control unit 15 from operating variables of internal combustion engine 1, compare input signals 16. Such operating variables are, for example, duration of injection, that is, the length of a time interval over which fuel is injected into combustion chamber 4, and an injection pressure, that is, the pressure ascertained with the aid of pressure sensor 14 in fuel accumulator 13, at which fuel is injected into combustion chamber 4.

An exemplary embodiment of the operating method according to the present invention is described below, in the light of FIG. 2, in which fuel is injected into combustion chamber 4 of internal combustion engine 1 from FIG. 1, using five partial injections. Accordingly, partial injection quantities $Qt1$, $Qt2$, $Qt3$, $Qt4$, $Qt5$ that are assigned to the five partial injections are drawn up at the top left in FIG. 2 as input variables of the illustrated functional diagram.

In this context, partial injection quantities $Qt1$, $Qt2$, $Qt3$ in each case show fuel quantities injected into combustion chamber 4 within the scope of a so-called pre-injection, whereas partial injection quantity $Qt4$ represents a partial injection quantity injected during a so-called main injection. Partial injection quantity $Qt5$ is assigned to a so-called post-injection, which is usually carried out to increase the exhaust gas temperature and which can be used, for instance, to regenerate a particulate filter (not shown) that is located in the exhaust gas tract of internal combustion engine 1.

Figure 2:
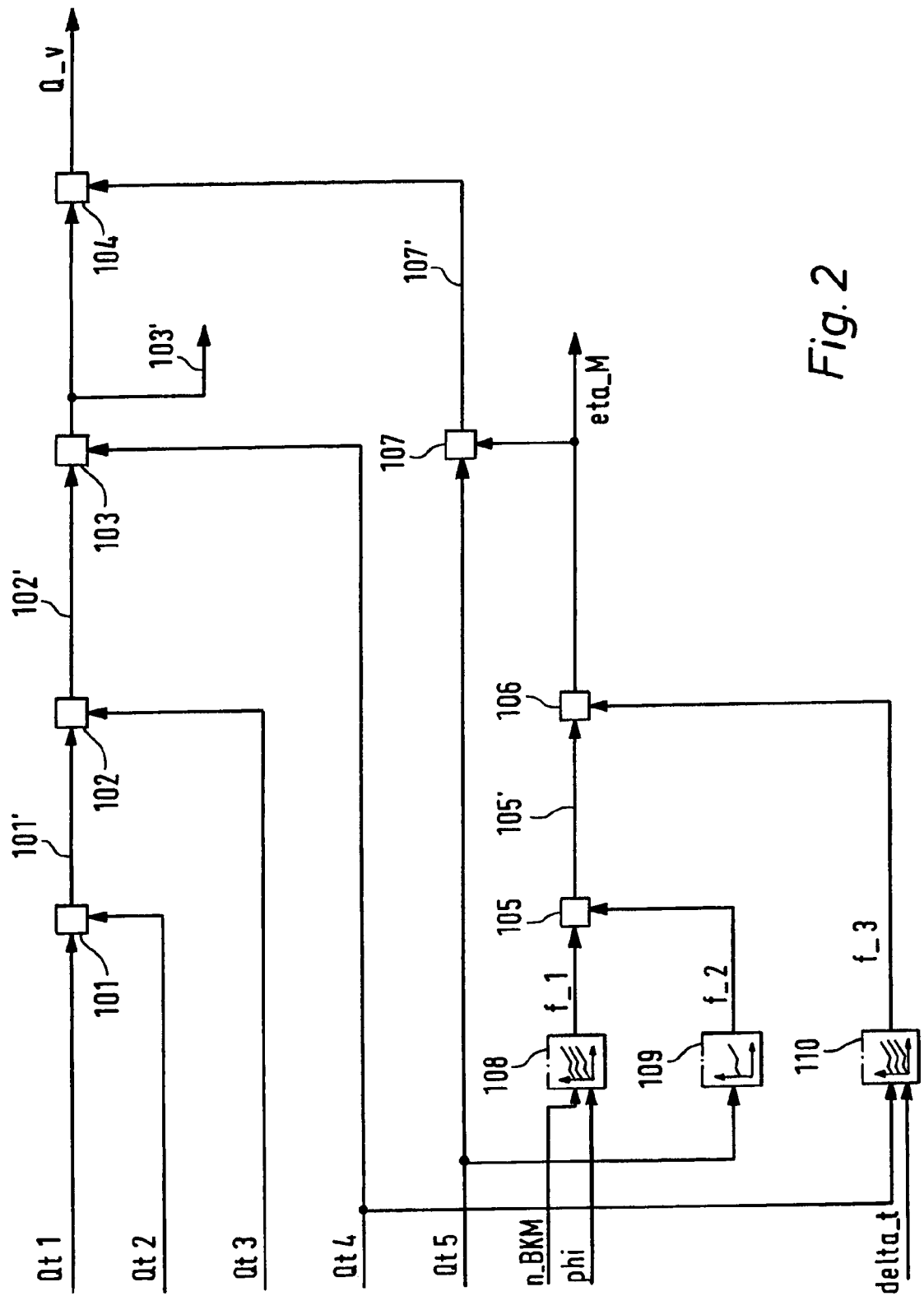
FIG. 2 shows a functional diagram of one specific embodiment of an example method according to the present invention.

As may be seen in FIG. 2, partial injection quantities $Qt1$ and $Qt2$ are added using adder 101, and the sum 101' resulting from this is added to partial injection quantity $Qt3$ using adder 102. The resulting composite signal 102' at the output of adder 102 is finally supplied to adder 103, in which partial injection quantity $Qt4$, which corresponds to the main injection, is added to the previous result, whereby composite signal 103' comes about at the output of adder 103.

Composite signal 103' denotes that fuel quantity which is injected overall into combustion chamber 4 of internal combustion engine 1, within the scope of the three pre-injections having respective partial injection quantities $Qt1$, $Qt2$, $Qt3$ and the main injection having partial injection quantity $Qt4$.

By contrast to the pre-injections and the main injection, which have approximately the same torque efficiency with respect to an actual torque supplied by internal combustion engine 1, a partial injection quantity $Qt5$, injected into combustion chamber 4 of internal combustion engine 1 within the scope of the post-injection, results in a comparatively lower actual torque. This difference is taken into account by torque efficiency eta_M, which is obtained at the output of multiplier 106, and the determination of which will be described below.

Partial injection quantity $Qt5$ of the post-injection multiplied in multiplier 107 by torque efficiency eta_M leads, at the output of multiplier 107, to effective partial injection quantity 107' of the post-injection, which is finally added in adder 104 to composite signal 103', and from which at the output of adder 104 a so-called virtual total fuel quantity Q_v is obtained.

Virtual total fuel quantity Q_v represents that fuel quantity which, at the main injection or at another partial injection, would have to be injected at the same torque efficiency as the main injection, that is, for instance, also in the case of a pre-injection, into combustion chamber 4 of internal combustion engine 1, in order to achieve the same actual torque as in the case of an injection of the actually used partial injection quantities Qt1 to Qt5. In the present example, only the post-injection has a torque efficiency eta_M that is reduced compared to the main injection, so that the effective post-injection quantity 107' is less than the actual partial injection quantity Qt5 of the post-injection, whereby overall virtual fuel quantity Q_v is also less than a non-weighted sum of partial injection quantities Qt1 to Qt5.

As may be seen in FIG. 2, torque efficiency eta_M of the post-injection is made up of a plurality of input variables.

A first factor f_1 is obtained from a rotary speed n_BKM of internal combustion engine 1 (FIG. 1), as well as from a so-called angle of beginning activation phi, using a characteristics map 108. Instead of angle of beginning activation phi, another variable may be used as well, which gives the injection point in time or rather its position in time in relation to a crank angle of the crankshaft of internal combustion engine 1.

Based on partial injection quantity Qt5 of the post-injection and characteristics curve 109, a second factor f_2 is formed which is multiplied in multiplier 105 by first factor f_1. Signal 105', that is present at the output of multiplier 105, represents an influence of the position in time of the post-injection, with reference to the crank angle, and partial injection quantity Qt5, injected during the post-injection, on torque efficiency eta_M of the post-injection.

In the case of the post-injection, beginning from a certain time interval delta_t from the main injection, since no further, or at least no further complete combustion of the post-injected fuel quantity takes place, this time interval delta_t is taken into consideration by characteristics map 110. Partial injection quantity Qt4, injected during the main injection, also enters into the above-described connection, and, according to FIG. 2, is accordingly also used as an input signal for characteristics map 110.

Factor f_3 obtained using characteristics map 110 is multiplied in multiplier 106 by output signal 105' of multiplier 105, that is, by the product of factors f_1 and f_2, from which eventually torque efficiency eta_M of the post-injection is obtained.

Thus, according to the present invention, torque efficiency eta_M is a function of a partial injection quantity Qt4 of the main injection, a partial injection quantity Qt5 of the post-injection, as well as of the rotary speed n_BKM of internal combustion engine 1, of angle of beginning activation phi and a time difference delta_t between the main injection and the post-injection.

As a function of these parameters, torque efficiency eta_M takes on a value between 0 and 1. Accordingly large or small is the influence of partial injection quantity Qt5 of the post-injection, that is weighted with torque efficiency eta_M, on the actual torque that is able to be ascertained in control unit 15 (FIG. 1) from virtual overall fuel quantity Q_v.

During the ascertainment of the actual torque from virtual overall fuel quantity Q_v, the torque contributions of the respective partial injections and their torque efficiencies that possibly deviate from 100%, as is the case, for instance, in the post-injection, are all already summarized in virtual overall fuel quantity Q_v, so that an especially simple ascertainment of the actual torque is possible from conventional methods.

Alternatively to the evaluation of angle of beginning activation phi, the position in time of the post-injection may be represented, for example, with reference to the top dead center of the operating cycle of cylinder 3, also by any other desired variables. For example, instead of angle of beginning activation phi, an injection point in time of the main injection or the post-injection may be used, provided an appropriate characteristics map is available.

In one additional, very advantageous specific embodiment of the present invention, analogously to factors f_1, f_2, F_3, additional factors (not shown) may also be taken into consideration, which are suitable for influencing torque efficiency eta_M.

For instance, torque efficiency eta_M may also be ascertained as a function of an air intake temperature and/or of an air pressure and/or of signals of a knock sensor and/or of operating variables of internal combustion engine 1.

It is also possible to ascertain torque efficiency eta_M as a function of a variation with time of the combustion. In this instance, for example, a pressure curve and/or a temperature curve in combustion chamber 4 could be used for an even more precise ascertainment of torque efficiency eta_M.

In one additional variant of the present invention, it is also possible, in the manner described above, to store ascertained values of torque efficiency eta_M, for instance, as a function of some or of all input variables Qt1, Qt2, Qt3, Qt4, Qt5, n_BKM, phi, delta_t, for example, for diagnostic purposes or for setting up corresponding characteristics maps.

Quite particularly advantageous, in this instance, is setting up or adjusting a multidimensional characteristics map for torque efficiency eta_M, which summarizes input variables Qt4, QT5, n_BKM, phi, delta_t that are shown in FIG. 2.

The example method according to the present invention for taking into consideration a torque efficiency is also not limited to ascertaining a torque efficiency of a post-injection. It is also possible, for instance, to ascertain a torque efficiency of a pre-injection, using the example method according to the present invention.

Virtual overall fuel quantity Q_v, as has already been described, is used for a calculation of the actual torque supplied by internal combustion engine 1, which, based on the consideration of torque efficiency eta_M, according to the present invention, yields a more accurate result than usual methods.

Based on the more accurate calculation of the actual torque, an improvement in monitoring the same is also made possible, within the scope of a comparison with an admissible torque, because in the monitoring, lower tolerance thresholds have to be set, and therefore deviations of the actual torque are able to be detected more rapidly. This makes possible a safer operation of internal combustion engine 1.

The example method described above with reference to FIG. 2 is able to be applied independently of the specific development of the injection system of internal combustion engine 1. For instance, it is just as applicable in so-called common rail injection systems having magnetic or even piezoelectric fuel injectors 9 as in single-cylinder injection pump systems. Even a superimposed lambda regulation, for optimizing the emission behavior of internal combustion engine 1, does not exclude the application of the method according to the present invention.

An additional specific embodiment of the present invention is described below with reference to FIG. 3.

Figure 3:
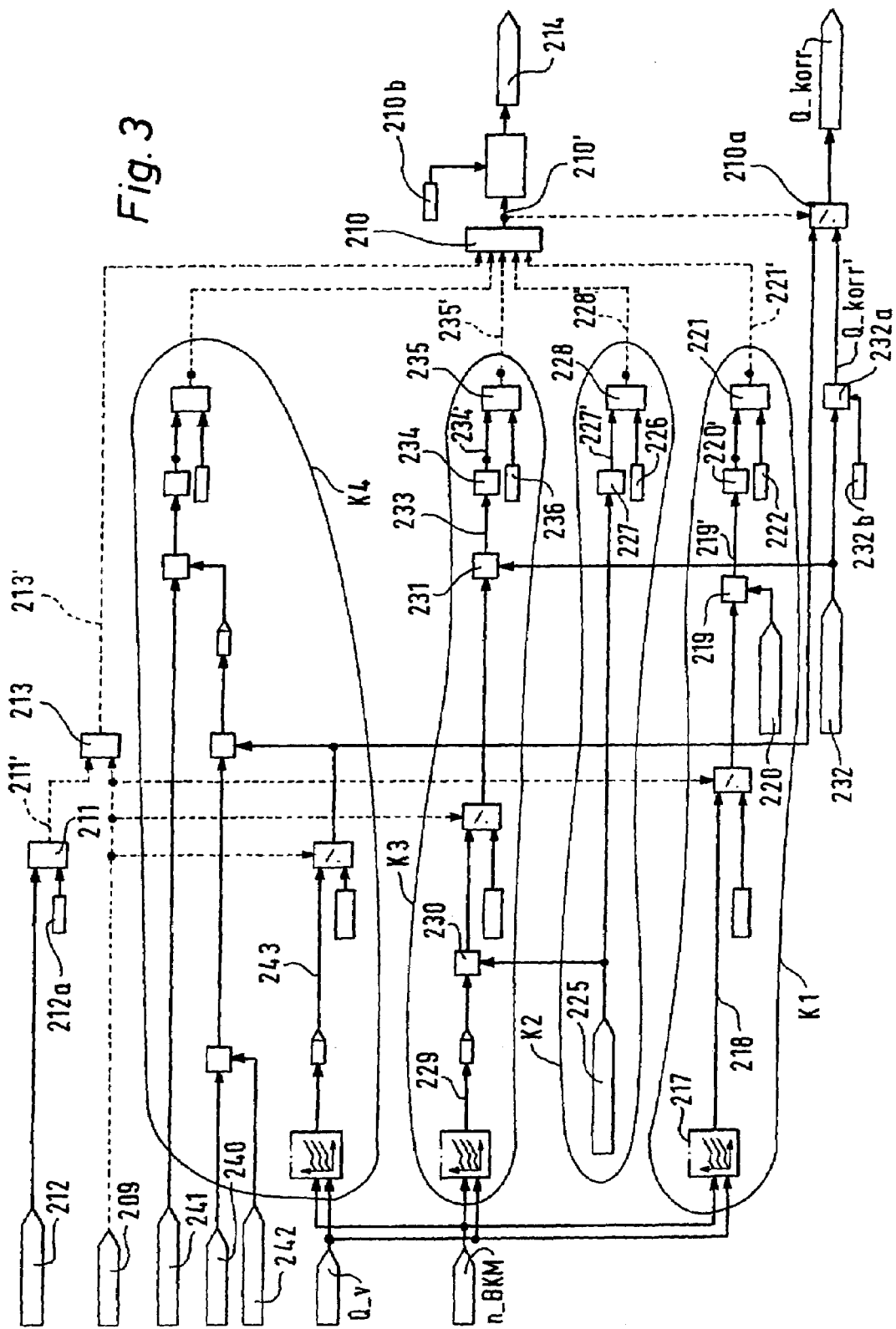
FIG. 3 shows a functional diagram of an additional specific embodiment of the example method according to the present invention.

The functional diagram shown in FIG. 3, just as the functional diagram according to FIG. 2, renders a variant of the method according to the present invention, as implemented in control unit 15 (FIG. 1) of internal combustion engine 1.

By contrast to the method explained with the aid of FIG. 2, in the method according to FIG. 3, for the functional monitoring according to the present invention, based on operating variables that are read in, of internal combustion engine 1, no characteristics lines or characteristics maps are available which specify a direct connection between an angle of beginning activation, a duration of injection, the rotary speed of the internal combustion engine, as well as possibly additional parameters and the torque efficiency.

The method according to FIG. 3 is used to ascertain a so-called correction quantity Q_korr, which, in a comparable manner to signal 107' in FIG. 2, represents a fuel quantity ascertained by calculation, which is ascertained for partial injections that have a torque efficiency eta_M (FIG. 2) that differs from 100%. In this context, Q_korr indicates that fuel quantity which, for instance, would have to be injected during a main injection in order to supply the same torque contribution to the actual torque as the actually injected partial injection quantity, during the partial injection at a torque efficiency deviating from 100%.

Analogously to signal 107' in FIG. 2, correction quantity Q_korr is able to be added to a fuel quantity corresponding to fuel quantity 103' in FIG. 2, for taking into consideration a torque contribution of a partial injection, in order to obtain virtual overall fuel quantity Q_v (FIG. 2), on the basis of which a simple ascertainment of the actual torque can be made, for instance, using a characteristics map.

Correction quantity Q_korr, based on the actually injected partial quantity (cf. Qt5 in FIG. 2), is equivalent to torque efficiency eta_M (FIG. 2).

FIG. 3 shows a variant of the method according to the present invention, as is used in an operating type of internal combustion engine 1 (FIG. 1) having a post-injection, that is, for instance, for implementing a regeneration operation. That means, that correction quantity Q_korr has only to be ascertained for a partial injection quantity (cf. Qt5 in FIG. 2) that corresponds to the post-injection.

In principle, it is also possible to use the method described below for ascertaining additional correction quantities, for instance, for partial injection quantities corresponding to pre-injections.

According to the present invention, in the method as in FIG. 3, a plausibility check of an operating point of internal combustion engine 1 takes place, and, as a function of this plausibility check, as the correction quantity Q_korr, the output is either a correction quantity Q_korr ascertained as a function of the operating point of internal combustion engine 1 or, in the case of a failed plausibility check, a corresponding substitute value Q_korr'. The plausibility check is made with the aid of several criteria, which, as shown in FIG. 3, are evaluated centrally by the OR gate, and are described below.

First of all, a signal 209 is evaluated, which is symbolized in FIG. 3 by a logic variable, that is able to assume the value one or zero. In response to a value one, signal 209 indicates that internal combustion engine 1 is not in a regeneration operation. According to the present exemplary embodiment, this means that no post-injections are provided for the operation of internal combustion engine 1.

The presence of a post-injection, possibly erroneously carried out anyway, is checked by comparator 211, which compares a measured actual post-injection duration 212 with a predefinable threshold value 212a. If post-injection duration 212 is greater than threshold value 212a, comparator 211 supplies at its output a signal 211', having the value one.

This signal 211', just as signal 209 described above, is conveyed to AND gate 213, so that, in response to a non-activated regeneration operation and a simultaneous exceeding of threshold value 212a by post-injection duration 212, an output signal 213' of AND gate 213 is output to OR gate 210, having the value one.

Independently of the additional input variables of OR gate 210, an output signal 210' of OR gate 210 also thereby assumes the value one, so that, as the correction quantity at the output of multiplexer 210a, substitute value Q_korr' is output instead of correction quantity Q_korr.

If output signal 210' of OR gate 210 has the value one for a time that is greater than filter time 210b, an error response is initiated that is controlled by signal 214.

If, however, output signal 210' of OR gate 210 has the value one only for a time less than filter time 210b, at the output of multiplexer 210a substitute value Q_korr' is temporarily output as the correction quantity, but no error response takes place yet as described above.

Consequently, AND gate 213 is used for monitoring that, in response to the absence of a regeneration operation of the internal combustion engine, that is, in general in response to an operating mode not having post-injection, indeed no post-injection actually takes place, by comparing post-injection duration 21 with the specifiable, for instance, applicable threshold value 212a.

Below, additional criteria K1, K2, K3, K4, are described, each of which is dependent upon an operating point of internal combustion engine 1. In this context, the operating point of internal combustion engine 1 is defined by input signals n_BKM, Q_v, where n_BKM indicates the rotary speed of internal combustion engine 1, analogous to FIG. 2, and Q_v indicates the virtual overall fuel quantity.

Rotary speed n_BKM is already present, in the exemplary embodiment described, as the assured, that is, validated variable in a functional monitoring that is implemented in control unit 15 (FIG. 1), to which the method as in FIG. 3 belongs. This means that, for the monitoring of internal combustion engine 1, and therewith, among other things, for ascertaining the actual torque, checking input variable n_BKM is not required.

By contrast to this, virtual overall fuel quantity Q_v in FIG. 3 is a variable that is read, by the functional monitoring mentioned, directly from a function that is also implemented in control unit 15, for the control of internal combustion engine 1. Variable Q_v obtained in this manner must not be used without a plausibility check for ascertaining correction quantity Q_korr, since it is only calculated in the controller but has not been validated yet.

Such a plausibility check is carried out in FIG. 3 by using the four criteria K1, K2, K3, K4, according to the present invention. If all four criteria K1, K2, K3, K4 are satisfied, virtual fuel quantity Q_v read out from the controller is sufficiently validated and may be used for ascertaining correction quantity Q_v, on the basis of which the actual torque will also finally be calculated.

In addition, a regeneration operation must simultaneously be present, that is, an operating type of internal combustion engine 1 having a post-injection, since the presently described plausibility check depends on an operating type of internal combustion engine 1, and is especially provided for the regeneration operation. In the regeneration operation, signal 209 has the value zero, so that the value zero is present also at the output of AND gate 213.

With regard to criterion K1, a setpoint value 218 for a start of pump delivery angle is ascertained from input signals n_BKM, Q_v in connection with characteristics map 217, from which a start of pump delivery angle 220 is subtracted in subtractor 219 that is ascertained from the operating variables of internal combustion engine 1 within the scope of a function monitoring, and the resulting difference 219' being supplied to an absolute-value generator 220', so that in comparator 221 an absolute value of difference signal 219' can be compared to a threshold value 222. Upon exceeding threshold value 222, that is, when start of pump delivery angle 220, that is ascertained from operating variables within the scope of function monitoring, deviates too greatly from start of pump delivery angle 218, which has been ascertained from input signals n_BKM, Q_v, output signal 221' of comparator 221, which is supplied to OR gate 210, assumes a value of one, so that, again, substitute value Q_korr' is output for the correction quantity, instead of the value Q_korr. In response to a longer lasting exceeding of boundary value 222, an error response is also initiated using signal 214.

Instead of start of pump delivery angle, an angle of beginning activation or another variable may be used as well, which gives the injection point in time or rather its position in time in relation to a crank angle of the crankshaft of internal combustion engine 1.

Within criterion K2, it is checked whether a lambda correction quantity 225 is greater in absolute value than a specified threshold value 226, which is made possible by absolute-value generator 227 and comparator 228. Lambda correction quantity 225 represents a fuel quantity which, based on a lambda regulation of internal combustion engine 1 that is superposed on the actual torque ascertainment, is added to an overall fuel quantity to be injected, in order to maintain a specified lambda value of the exhaust gas of internal combustion engine 1.

If lambda correction quantity 225 or its absolute value 227' exceeds threshold value 226, then by criterion K2 an output of substitute value Q_korr' or an error response is initiated using signal 214, in that output signal 228' of comparator 228 assumes the value one.

Within the scope of criterion K3 it is checked whether a partial injection quantity 232 of the post-injection (cf. Qt5 in FIG. 2), that is ascertained from operating variables of internal combustion engine 1 for the function monitoring, corresponds to setpoint value 229 for the partial injection quantity of the post-injection plus lambda correction quantity 225. For this, lambda correction quantity 225 as well as setpoint value 229 are summed in adder 230, and in subtractor 231, partial injection quantity 232, that was described before, is subtracted. The resulting difference 233 is supplied to absolute-value generator 234, whose output signal 234' is supplied to comparator 235, same as threshold value 236. As soon as absolute quantity 234' of difference 233 exceeds threshold value 236, an error response is initiated, via output signal 235' of comparator 235 that is supplied to OR gate 210, in the manner described several times above, or at least the intermittent output of substitute quantity Q_korr' is performed.

In optional criterion K4 for the operating method described, a quantity balance of different partial injection quantities is evaluated. In this regard, an overall injection quantity 240, ascertained within the scope of the control of internal combustion engine 1, that is, the sum of all partial injection quantities is checked for possibly occurring pre-injections and post-injections, as well as the main injection, to see whether it corresponds to a main injection quantity 241, ascertained from operating variables of internal combustion engine 1, plus a pre-injection quantity 242, also ascertained from operating variables of internal combustion engine 1 and a post-injection quantity 243. In this connection, post-injection quantity 243 is ascertained, according to FIG. 3, from virtual overall fuel quantity Q_v and rotary speed n_BKM of the internal combustion engine.

In case none of the above-described criteria K1 through K4 or output signal 213' of AND gate 213 leads to an output signal of the comparator of OR gate 210 that is different from zero, post-injection quantity 243 is output as output signal of FIG. 3 as correction quantity Q_korr.

Otherwise, that is, in the case of non-satisfaction of at least one of criteria K1 through K4 or in the case of output signal 213' of AND gate 213 that is different from zero, substitute value Q_korr' is output.

Substitute value Q_korr' is calculated from a partial injection quantity 232 of the post-injection (cf. Qt5 of FIG. 2) that is ascertained from operating variables of internal combustion engine 1, and it is multiplied in multiplier 232a by a maximum possible efficiency 232b of a main injection. In this way it is ensured that, in the error case, that is, a plausibility check that has failed, for the ascertainment of the actual torque within the scope of function monitoring, one may assume as large as possible a fuel quantity as substitute value Q_korr'. Therefore, the ascertained actual torque is also not mistakenly calculated too low, in the error case.

Efficiency 232b is able to be calculated automatically, or may also be stored in control unit 15 as a constant.

The method according to the present invention is also able to be used for other operating types of internal combustion engine 1, in each case other criteria being selected for the plausibility check. For example, analogously to the method described, correction quantities and torque efficiencies may also be ascertained for pre-injections.

In operating methods in which the actual torque is able to be controlled by changing the air supply, e.g. using a throttle valve, the method according to the present invention can also be used.

In addition, the method according to the present invention is able to be implemented using a comparatively low expenditure of resources, such as a RAM, ROM and execution time in control unit 15.

What is claimed is:

1. A method for operating an internal combustion engine, comprising:
  injecting fuel into a combustion chamber of a cylinder of the internal combustion engine in at least two partial injections;
  ascertaining an actual torque supplied by the internal combustion engine from operating variables of the internal combustion engine;
  comparing the actual torque to an admissible torque; and
  initiating an error response if the actual torque is at a prespecified ratio to the admissible torque;
  wherein a torque efficiency of a respective partial injection is taken into consideration in the ascertainment of the actual torque.

2. The method as recited in claim 1, further comprising:
  ascertaining the torque efficiency as a function of a rotary speed of the internal combustion engine.

3. The method as recited in claim 1, further comprising:
  ascertaining the torque efficiency as a function of at least one of a crank angle and an angle of beginning activation of the internal combustion engine.

4. The method as recited in claim 1, further comprising:
  ascertaining the torque efficiency as a function of a partial injection quantity that corresponds to the respective partial injection.

5. The method as recited in claim 1, further comprising:
  ascertaining the torque efficiency as a function of a time difference between various partial injections.

6. The method as recited in claim 5, wherein the torque efficiency is ascertained as a function of a time difference between a main injection and another partial injection.

7. The method as recited in claim 1, further comprising: ascertaining the torque efficiency as a function of a variation with time of a combustion.

8. The method as recited in claim 1, further comprising: ascertaining the torque efficiency as a function of at least one of: i) an air intake temperature, ii) an air pressure, iii) signals of a knock sensor, iv) additional sensor signals, and v) operating variables of the internal combustion engine.

9. The method as recited claim 1, wherein the torque efficiency is linked to a partial injection quantity that corresponds to the respective partial injection, the torque efficiency being linked at least one of: i) additively, ii) multiplicatively, and iii) via a characteristics map.

10. The method as recited in claim 1, wherein ascertained values of the torque efficiency are at least one of stored and reused.

11. The method as recited in claim 1, wherein, for the ascertainment of the actual torque, a virtual overall fuel quantity is ascertained as a function of the torque efficiency.

12. The method as recited in claim 1, further comprising: checking an operating point of the internal combustion engine for plausibility, the operating point being defined by at least one of a virtual overall fuel quantity and a rotary speed of the internal combustion engine.

13. The method as recited in claim 12, wherein the plausibility check of the operating point is carried out as a function of an operating mode of the internal combustion engine.

14. The method as recited in claim 13, wherein criteria for the plausibility check are selected as a function of the operating mode.

15. The method as recited in claim 12, wherein, after an expiration of a filter time, an error response is initiated if the plausibility check fails.

16. The method as recited in claim 15, wherein a maximum possible torque efficiency is assumed during the filter time.

17. The method as recited in claim 16, wherein the maximum possible torque efficiency is obtained from a controller of the internal combustion engine.

18. The method as recited in claim 1, wherein, in an operating mode of the internal combustion engine not having post-injections, a duration of injection of a post-injection ascertained from operating variables of the internal combustion engine is monitored for an exceeding of a predefinable threshold value.

19. The method as recited in claim 1, wherein the internal combustion engine is operated in an operating mode having at least one post-injection, the operating mode being a regeneration operating mode for regeneration of a particulate filter in an exhaust gas tract of the internal combustion engine.

20. The method as recited in claim 1, wherein the internal combustion engine is operated in an operating mode having at least one pre-injection.

21. The method as recited in claim 1, wherein the internal combustion engine is operated in an operating mode in which a torque supplied by the internal combustion engine is able to be set by a change of an air quantity.

22. The method as recited in claim 1, wherein injection parameters ascertained from operating variables of the internal combustion engine including an injection starting point in time and a duration of injection, are monitored for agreement with setpoint injection parameters ascertained in a controller of the internal combustion engine.

23. The method as recited in claim 1, wherein an influence of a lambda regulation is monitored for an exceeding of a predefinable boundary value.

24. A memory device storing a computer program for a control unit of an internal combustion engine, the computer program, when executed by a computer, causing the computer to perform the steps of:
injecting fuel into a combustion chamber of a cylinder of the internal combustion engine in at least two partial injections;
ascertaining an actual torque supplied by the internal combustion engine from operating variables of the internal combustion engine;
comparing the actual torque to an admissible torque; and
initiating an error response if the actual torque is at a prespecified ratio to the admissible torque;
wherein a torque efficiency of a respective partial injection is taken into consideration in the ascertainment of the actual torque.

25. The memory device as recited in claim 24, wherein the memory device is a computer-readable data carrier.

26. A control unit for an internal combustion engine, in which fuel is injectable into a combustion chamber of a cylinder of the internal combustion engine in at least two partial injections, the control unit being adapted to ascertain an actual torque supplied by the internal combustion engine from operating variables of the internal combustion engine, the actual torque being compared to an admissible torque, and an error response being initiated if the actual torque is at a predefined ratio to the admissible torque, a torque efficiency of a respective partial injection being taken into consideration in the ascertainment of the actual torque.

27. The control unit as recited in claim 26, wherein the control unit is further adapted to ascertain the torque efficiency as a function of a rotary speed of the internal combustion engine.

28. An internal combustion engine, in which fuel is injectable into a combustion chamber of a cylinder in at least two partial injections, and in which an actual torque supplied by the internal combustion engine is ascertained from operating variables of the internal combustion engine, the actual torque being compared to an admissible torque, and an error response being able to be initiated if the actual torque is at a prespecified ratio to the admissible torque, wherein a torque efficiency of a respective partial injection is taken into consideration in the ascertainment of the actual torque.

29. The internal combustion engine as recited in claim 28, wherein the internal combustion engine is adapted to ascertain the torque efficiency as a function of a rotary speed of the internal combustion engine.

* * * * *